3,175,006
N-(ORTHO-METHOXYPHENOXY-ETHYL)-
n-PROPYLAMINE
Jean Druey, Riehen, and Karl Schenker, Basel, Switzerland, assignors to Ciba Corporation, New York, N.Y., a corporation of Delaware
No Drawing. Filed Dec. 19, 1963, Ser. No. 331,965
Claims priority, application Switzerland, Oct. 2, 1958, 64,591/58; Mar. 18, 1959, 70,943/59; Aug. 5, 1959, 76,600/59
2 Claims. (Cl. 260—570.7)

The invention relates to a new secondary amine. More especially it concerns the N-(ortho-methoxyphenoxyethyl)-n-propylamine of the formula

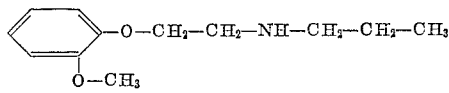

and salts thereof.

The new compound and its salts possess valuable pharmacological properties. Inter alia, they have a pronounced sympaticolytic effect with a sedative component. Thus, for example, they show a sedative or sympathicolytic effect when tested in animals, such as mice, rats, rabbits, cats and dogs. They are useful as sympathicolytic and sedative agents. They are superior to N-(ortho-methoxyphenoxy-ethyl)-N-R-amines, in which R represents an alkyl radical containing from 4 to 5 carbon atoms.

The new compound and its salts are also suitable as intermediates in the manufacture of pharmacologically active compounds.

The new amine is prepared by methods known per se. It is, for example, obtained, when a compound of the formula

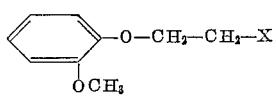

in which X represents a reactive esterified hydroxyl group, is reacted with n-propylamine.

A reactive esterified hydroxyl group is for example a hydroxyl group esterified with a strong inorganic acid, for example a hydrohalic acid, such as hydrochloric acid, hydrobromic acid or hydriodic acid, or sulfuric acid, or a strong organic acid, such as a sulfonic acid, e.g. an alkane- or aryl-sulfonic acid. The reaction is carried out in a manner known per se, in the presence or absence of a diluent and/or condensing agent, preferably at a raised temperature under atmospheric or superatmospheric pressure.

Depending on the starting materials and the reaction conditions used, the new compound is obtained in the free form or in the form of its salts, which also form part of this invention. The salts of the new compound can be transformed in known manner into the free compound; for example by reaction with a basic agent or an ion exchanger. On the other hand, the resulting free compound may form salts with inorganic or organic acids. Acid addition salts are preferably manufactured with pharmacologically tolerable acids, for example hydrohalic, sulfuric, phosphoric, nitric, perchloric acids; aliphatic, alicyclic, aromatic or heterocyclic carboxylic or sulfonic acids, such as formic, acetic, propionic, succinic, glycolic, lactic, malic, tartaric, citric, ascorbic, maleic, hydroxymaleic or pyruvic acid; phenylacetic, benzoic, para-aminobenzoic, anthranilic, para-hydroxybenzoic, salicylic, or para-aminosalicylic acid, embonic, methanesulfonic, ethanesulfonic, hydroxyethanesulfonic, ethylenesulfonic acid; halogenbenzenesulfonic, toluenesulfonic, naphthalenesulfonic or sulfanilic acid; methionin, tryptophane, lysin or arginin.

The resulting free compound can be purified by being converted into these or other salts, for example the picrates, which are then isolated and the free compound liberated.

In view of the close relation between the new compound in the free form and in the form of a salt thereof, whenever the free base is referred to in this context, a corresponding salt is also intended provided such is possible or applicable under the circumstances.

The starting materials are known or can be produced by methods known per se.

The new compound may be employed for example, in the form of pharmaceutical preparations, which contain it in the free form or in the form of a salt in admixture or conjunction with a pharmaceutical organic or inorganic solid or liquid carrier suitable for enteral, or parenteral application. For making the carrier there are used substances which do not react with the new compounds, such as, for example, water, gelatine, lactose, starch, magnesium stearate, talc, vegetable oils, benzyl alcohols, gums, polyalkylene glycols, white petroleum jelly, cholesterol or other known carriers for medicaments. The pharmaceutical preparations may be in the form, for example, of tablets, dragees or in liquid form as solutions, suspensions or emulsions. If desired, they are sterilized and/or contain auxiliary substances, such as preserving, stabilizing, wetting or emulsifying agents, salts for changing the osmotic pressure or buffers. They may also contain other therapeutically valuable substances. The preparations contain advantageously 1 to 50 mg., preferably 5 to 20 mg. of the active compound per dosage unit. They are produced by conventional methods.

This is a continuation in part application of our copending application Serial No. 841,689, filed September 23, 1959, and now abandoned.

The invention is described in detail in the following example. The temperatures are given in degrees centigrade.

*Example*

10 grams (0.042 mole) of o-methoxyphenoxyethyl bromide and 15 grams (0.25 mole) of n-propylamine are heated in 20 cc. of ethanol for 15 hours under reflux. The solvent and the excess amine are evaporated in a water-jet vacuum, the residue is taken up in 100 cc. of 2 N-hydrochloric acid, the neutral part is removed by extraction with ether and the aqueous solution is decolorized with charcoal. The solution is rendered alkaline by adding dilute caustic soda solution and the precipitated base is extracted with chloroform. N-(o-methoxyphenoxy-ethyl)-n-propylamine of the formula $$\underset{\underset{\displaystyle OCH_3}{|}}{\bigcirc}-O-CH_2-CH_2-NH-CH_2-CH_2-CH_3$$

is obtained after the evaporation of the chloroform as a viscous, almost colorless oil. The hydrochloride, which is prepared by dissolving the free base in ethyl acetate, neutralizing the solution with a 2 N-solution of hydrochloric acid in ethyl acetate, evaporating it and recrystallizing the residue obtained from ethyl acetate-ethanol, forms colorless crystals having a melting point of 140–142° C.

What is claimed is:
1. N-(ortho-methoxyphenoxy-ethyl)-n-propylamine.
2. The compound claimed in claim 1 in the form of a salt pharmaceutically acceptable acid addition.

References Cited in the file of this patent
UNITED STATES PATENTS
2,967,201    Soper _____ Jan. 3, 1961

UNITED STATES PATENT OFFICE
CERTIFICATE OF CORRECTION

Patent No. 3,175,006                            March 23, 1965

Jean Druey et al.

It is hereby certified that error appears in the above numbered patent requiring correction and that the said Letters Patent should read as corrected below.

Column 2, line 67, strike out "salt" and insert the same after "addition" in same line 67, same column 2.

Signed and sealed this 28th day of September 1965.

(SEAL)
Attest:

ERNEST W. SWIDER                          EDWARD J. BRENNER
Attesting Officer                             Commissioner of Patents